Feb. 23, 1954   W. P. FRANKENSTEIN   2,670,126
CARTON
Filed Feb. 24, 1949                                           7 Sheets-Sheet 1

INVENTOR.
WILLIAM P. FRANKENSTEIN
BY
Joseph A. Rave
Attorney

Feb. 23, 1954 W. P. FRANKENSTEIN 2,670,126
CARTON
Filed Feb. 24, 1949 7 Sheets-Sheet 2

INVENTOR.
WILLIAM P. FRANKENSTEIN
BY
Joseph A. Rave
Attorney

Feb. 23, 1954 W. P. FRANKENSTEIN 2,670,126
CARTON
Filed Feb. 24, 1949 7 Sheets-Sheet 3

INVENTOR.
WILLIAM P. FRANKENSTEIN
BY
Joseph A. Rave
Attorney

Feb. 23, 1954   W. P. FRANKENSTEIN   2,670,126
CARTON
Filed Feb. 24, 1949   7 Sheets-Sheet 5

INVENTOR.
WILLIAM P. FRANKENSTEIN
BY
Joseph A. Rave
Attorney

Feb. 23, 1954 W. P. FRANKENSTEIN 2,670,126
CARTON
Filed Feb. 24, 1949 7 Sheets-Sheet 6

INVENTOR.
WILLIAM P. FRANKENSTEIN
BY
Joseph A. Rave
Attorney

Feb. 23, 1954  W. P. FRANKENSTEIN  2,670,126
CARTON
Filed Feb. 24, 1949  7 Sheets-Sheet 7

INVENTOR.
WILLIAM P. FRANKENSTEIN
BY
Joseph A. Rave
Attorney

Patented Feb. 23, 1954

2,670,126

UNITED STATES PATENT OFFICE 2,670,126

CARTON

William P. Frankenstein, Cincinnati, Ohio

Application February 24, 1949, Serial No. 78,052

14 Claims. (Cl. 229—31)

This invention relates to improvements in cartons and particularly to improvements in partially assembled or knocked-down cartons.

An object of this invention is the provision of a carton having an open top through which the contents may be viewed and in which the walls of the carton cooperate with the object therein in retaining it in position relative to the carton.

Another object of this invention is the provision of a carton of the knocked-down variety, that is, a carton in which the walls are so related to the carton bottom that they may be readily erected by substantially unskilled labor to form a carton, that will accomplish the foregoing object.

Another object of this invention is the provision of a display and shipping carton in which the walls of the carton are so related to one another and to the carton bottom as to retain and cushion an article therein during shipment and at the same time act as an artistic display for the said article.

A further object of this invention is the provision of a display and shipping carton in which the walls of the carton are so related to one another and to the bottom of the carton as to give seemingly greater depth to the carton and a general shadowy interior to enhance the article being displayed.

A still further object of this invention is the provision of a knocked-down carton formed from a single blank partially assembled by the manufacturer so that the same may be readily set up by the user to provide a carton that accomplishes the foregoing objects.

It is also an object of this invention to provide a carton for accomplishing the foregoing objects that is simple in construction, easy to erect and set up, and has strength and rigidity comparable with set-up cartons.

It is a still further object of this invention to provide a blank which may be readily modified to produce cartons that are fundamentally similar in construction, mode of operation, and ease in assembly.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

The drawings illustrate several modifications of the carton and its blank forming the subject matter of this invention and which modifications will be described in succession having reference to the simplest form of the invention illustrated in Figs. 1 to 5, inclusive. It will be understood that in the modifications only those portions of the blank and carton which are not found in the carton as illustrated in Figs. 1 to 5 will be referred to.

Figure 1:
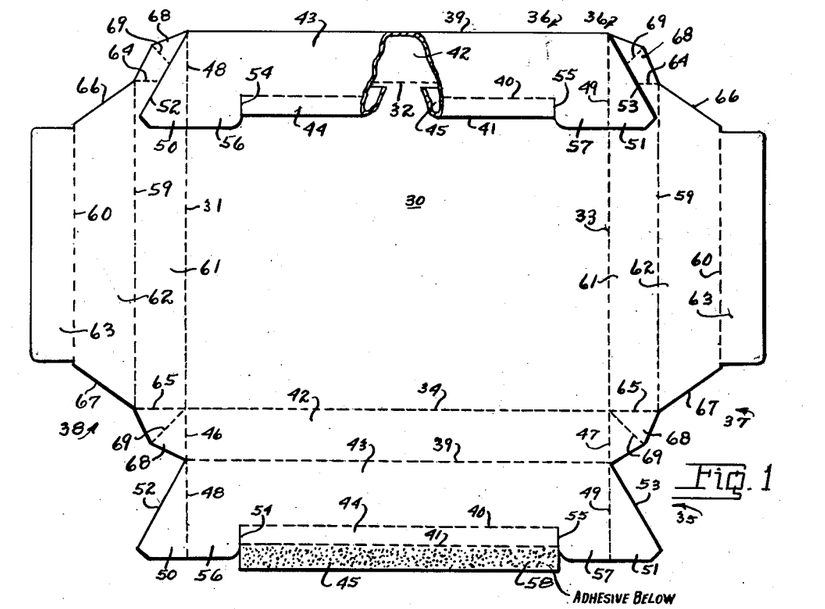
Fig. 1 is a blank, partially folded, from which a carton embodying the principles of the present invention may be set up.

As seen in Fig. 1, the blank is of a single piece of card or paper board material and comprises a main or bottom panel 30 having its edges or its sides defined by score or fold lines 31, 32, 33 and 34. The score or fold lines 32 and 34, respectively, hingedly connect with the bottom 30 similar extensions 35 and 36 which form in the erected carton the side walls. Similarly the score or fold lines 31 and 33, respectively, hingedly connect with the bottom 30 extensions 37 and 38 which in the erected carton form the carton end walls that cooperate with the side walls in completing the carton. It should be understood that the terms "side" and "end" are being used for the purposes of clearness in description since the longer walls are generally referred to as the side walls while the shorter connecting walls are generally referred to as the end walls.

Since the side wall extensions 35 and 36 are substantially identical it is deemed sufficient if but one of them be described in detail for the both. Accordingly, extension 35 is divided, between the score or fold line 34 and the end of the extension, longitudinally by a plurality of parallel score or fold lines 39, 40 and 41 thereby providing in said extension parallel panels 42, 43, 44 and 45. The panel 42 in the erected carton forms the side wall outer wall member and has its ends defined by score or fold lines 46 and 47 and which score or fold lines 46 and 47 are extensions of the carton bottom ends defining scores 31 and 33 respectively. The panel 43 is of greater width than the panel 42 and in the erected carton forms the side wall top wall member inclining inwardly and downwardly of the carton from the top of the outer wall member or panel 42, with said panel 43 having its ends defined by score or fold lines 48 and 49 which may be extensions of the panel 42 score or fold lines 46 and 47, respectively. The panel 43 has respectively, hingedly, connected to its ends through the score or fold lines 48 and 49, tabs 50 and 51 which are substantially triangular shape in plan and which, as will later be made clear, when in their final erected position have their inclined or outer edge 52 and 53 at the upper edge of the end wall and parallel with said end wall upper edge. The panel 44 in the erected carton forms the side wall inner wall member for the effective length of the interior of the carton and for which reason it is somewhat shorter than the top wall member or panel 43 and said panel 44 has its ends defined by cut lines 54 and 55. The top wall member or panel 43 beyond the inner wall member or panel 44, and between, respectively, score or fold line 48 and cut line 54 and score or fold line 49 and cut line 55, projects as lugs 56 and 57 which, as will later be made clear, act to position the side walls top wall members in their inwardly inclining positions. The remaining panel 45 of the extension 35 is of a length equal to that of the side wall inner wall member or panel 44 and in the erected carton is a glue flap for fastening or securing the lower end of the carton inner wall member or panel 44 to the carton bottom 30 and for this reason the said flap 45 is provided, on its undersurface, as seen in Fig. 1, with adhesive 58.

The end wall extensions 37 and 38 are substantially identical with one another and it is believed that a description of one of them will suffice for the both. Accordingly, the extension 37 is provided longitudinally thereof with a pair of score or fold lines 59 and 60 thereby providing in said extension, between the score or fold line 33 and the end of the extension, panels 61, 62 and 63. In the erected carton the panel 61 constitutes the carton end wall outer wall member having its ends defined by score or fold lines 64 and 65 which are in effect continuations of the carton main or bottom panel 30 side defining scores or fold lines 32 and 34. The panel 62 in the erected carton forms the end wall top wall member which, similar to the side walls top wall members or panels 43, incline inwardly and downwardly and said panel 62 has its ends resting on the side walls top wall members wherefore said panel 62 has its ends biased or angularly disposed as at 66 and 67. It is understood that the angularity of the ends 66 and 67 depends on the angle of inclination of the side walls top wall members or panels 43 when in their final erected positions. The remaining panel 63 forms the end wall inner wall member and tucking flap and corresponds with the side walls inner wall members or panels 44. It should be noted that the panel 62 has a width substantially equal to the width of the side wall panels 43 at the portion thereof which is disposed between score or fold lines 39 and 40 since the said panels, that is the exposed portions thereof between the cut lines 54 and 55, and the panel 62 provide the continuous top wall for the carton as will presently be made clear.

The adjacent side walls outer wall members end scores and the end walls outer wall members end scores 46, 47, 64 and 65, hingedly connect between the adjacent ends of the said outer wall members, corner pieces 68, each of which is provided with a diagonal score 69 whereby said corner pieces are folded on one another to form, what is known in the trade, as a bellows corner.

After the blank has been cut and scored as illustrated in Fig. 1 and above described the adhesive 58 is applied to the undersurface of the flaps 45 of each side wall extension whereupon the said flaps are folded on their respective score or fold line 41 to lie on the panel 44. The extensions 35 and 36 are then respectively folded folded on their score or fold lines 39 to bring the panels 45, and particularly the adhesive 58 of said panels, into engagement with the carton main or bottom panel 30. The said extensions 35 and 36 are now in the position of extension 36 as illustrated at the upper end of Fig. 1 or as illustrated in transverse across-section in Fig. 2. It is in this position that the carton is shipped to the user.

Figures 2, 3:
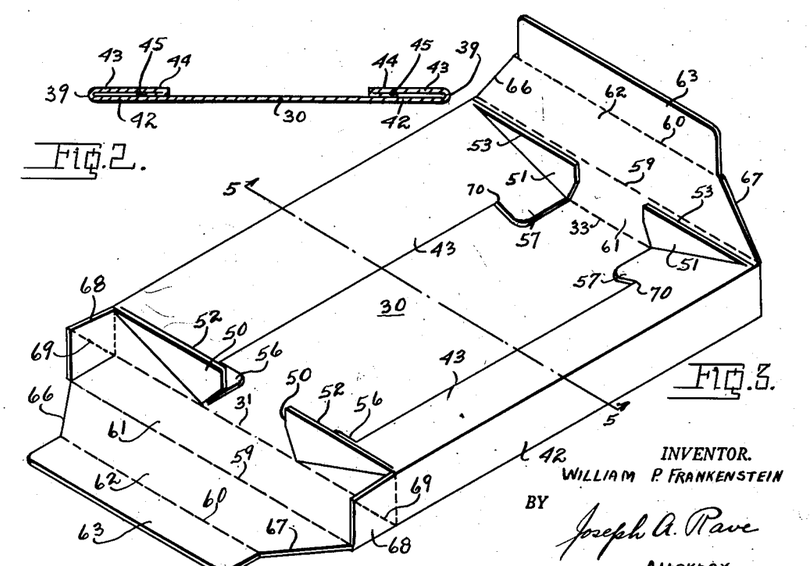
Fig. 2 is a sectional view of the folded blank as shipped to the user.
Fig. 3 is a perspective view of a partially erected carton from the blank of Fig. 1.

It will be appreciated that in its knocked-down or folded position of Fig. 2 a considerable quantity of cartons may be placed or stored in a comparatively small space ready for erection by the user.

Figure 5:
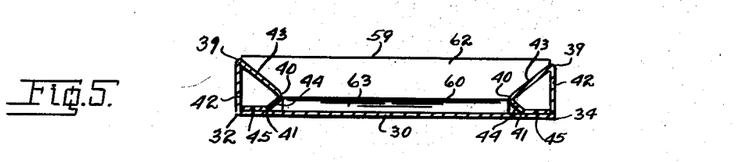
Fig. 5 is a transverse sectional view of the carton of Fig. 3 taken on line 5—5 on said Fig. 3.

The user upon desiring to erect or set up the carton from its knocked-down position in Fig. 2, does so by merely raising the side walls to the position to have the side walls outer wall members normal to the main or bottom panel 30 as clearly illustrated in Fig. 5. The relation of the parts or panels 42, 43, 44 and 45 to one another is such that these side walls now have their outer wall members normal to the bottom panel with their top wall members inclining inwardly and downwardly toward the main or bottom panel 30 with the inner wall members inclining outwardly and downwardly, or oppositely to the direction of inclination of the top wall members, and with the outer or lower ends of said outwardly inclining inner wall members secured to the main or bottom panel 30 by the panels or glue flaps 45. At this time the blank is in the partially erected condition of Fig. 3 with the end wall forming extensions 37 and 38 parallel with the main or bottom panel 30 and projecting outwardly thereof. As will be noted, the lugs 56 and 57 of the side walls top wall members have their edges resting on the main or bottom panel for thereby acting as end supports for the said top wall members 43.

At this time the triangular tabs 50 and 51 are raised on their score or fold lines 48 and 49 to upstand as illustrated in Fig. 3 and with their inclined edge 52 and 53 now extending parallel with the base or bottom panel 30 and at a point to underlie the score or fold line 59 between the end wall panels 61 and 62 as will presently be made clear.

Figure 4:
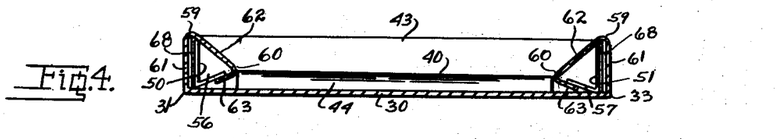
Fig. 4 is a longitudinally central view of a completely erected carton of Fig. 3 taken at right angles to the section illustrated in Fig. 5.

The user now raises, in succession, the end wall extensions 37 and 38 about their connecting hinge or fold lines 33 and 34, respectively. This raising of either of the said end wall extensions automatically folds the corner pieces 68 thereof on their respective diagonal score or fold lines 69 to lie between the ends of the side walls top wall members or the said side walls top wall members flaps 50 and 51 and the end wall outer wall member 61. The panel 62 is then folded on the score or fold line 59 inwardly of the carton until its inclined or biased ends 66 and 67 rest on the side walls inclined top wall members or panels 43. The relationship of the parts is such that the said end wall top wall member ends 66 and 67 extend from the corner of the carton to the corner formed inwardly of the side wall lugs 56 and 57 and which corner is indicated by the reference character 70 in Fig. 3. The distance between the corners 70 of the side wall top wall members is substantially equal to the length of the end wall inner wall member or panel 63 whereupon the said panel is tucked beneath the said side wall lugs 56 and 57 with the relationship of the parts being such that the said inner wall member inclines as illustrated in Fig. 4 even to the extent of slightly raising the innermost edges of the said lugs.

The insertion of the end walls inner wall member or panel 63 beneath the side walls top wall members lugs substantially locks the carton walls in their final erected position whereupon articles may be placed in the carton. It should be understood that the article may be placed in the carton after the first end wall has been erected and prior to the erection of the second end wall.

The modification disclosed in Figs. 6 to 11, inclusive, is concerned primarily with reinforcing the corners of the carton and in locking the walls in their erected positions. In this modification the side wall extensions 35' and 36' have the ends of the top walls or panels 43' defined by score or fold lines 71 and 72 which are angularly related to the main or bottom panel fold or score lines 31 and 33 instead of being substantially continuations thereof as disclosed in Fig. 1. This construction results in substantially triangularly shaped lugs 73 and 74 which have one of their sides formed by cut lines 75 and 76 and which cut lines take the place of cut lines 54 and 55 in the modification in Fig. 1 and at the same time define the ends of the side walls inner wall members or panels 44'. It should be noted that in each side wall extension the said cut lines 75 and 76 project beyond the panel 44' toward the carton main or bottom panel 30 with the said projections indicated by reference characters 77 and 78 and are for a purpose later to be made clear.

Figure 6:
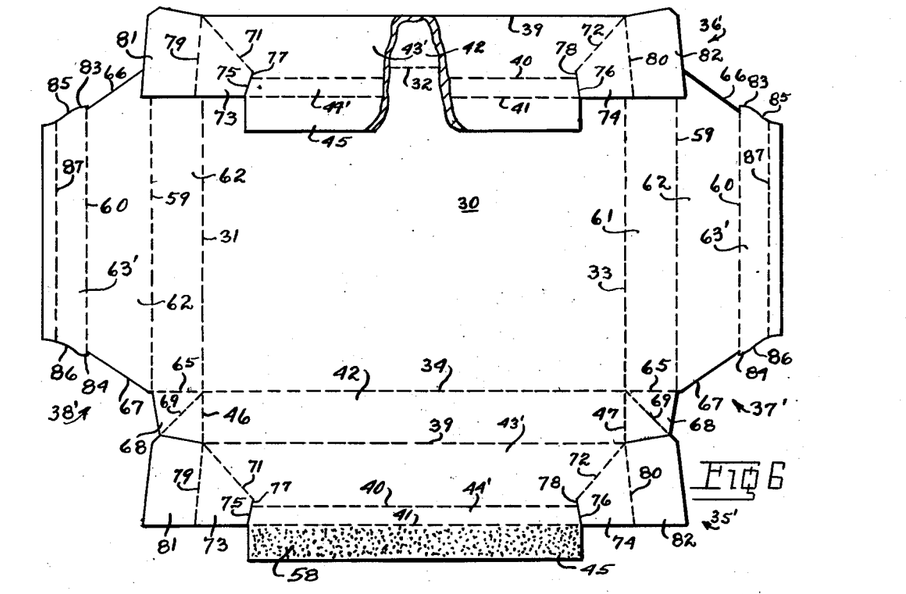
Fig. 6 is a view similar to Fig. 1 of a partially folded blank illustrating a slightly modified blank for forming a slightly modified carton.

The outer side of the substantially triangularly shaped lugs 73 and 74 are respectively defined by score or fold lines 79 and 80 which respectively hingedly connect with the said lugs 73 and 74 tabs 81 and 82.

The modification in Fig. 6 further includes the end wall inner wall member or panel 63' of each of the end wall extensions 37' and 38' as being of a length, where it is hingedly connected with the end wall top wall member 62 through the score or fold line 60, greater than its adjacent edge of the end wall top wall member thereby providing projections or locking lugs 83 and 84 on said end wall inner wall member beyond the said adjacent edge of the end wall top wall member. The ends of the panel 63' are further provided with an arcuate shape as illustrated at 85 and 86 instead of having these ends normal to the axis of the blank as illustrated in Fig. 1 and which formations will be described in detail in the erection of the carton. In addition, the panel 63' is provided near its outer end with a score or fold line 87 thereby affording ease in setting up the carton as will be obvious from Fig. 9.

The blank of Fig. 6 is adapted to have the adhesive 58 applied to the panel or glue flap 45 on its upper surface instead of on its undersurface as above described in connection with the blank of Fig. 1. With the construction of Fig. 6 a single fold is made of the side wall extensions 35' and 36', said fold being only on the score or fold line 39 which brings the glue flap or panel 45 onto the blank main or bottom panel 30 and when the carton is erected the said glue flaps project toward the center of the panel or bottom 30 instead of outwardly thereof.

Figures 7, 8:
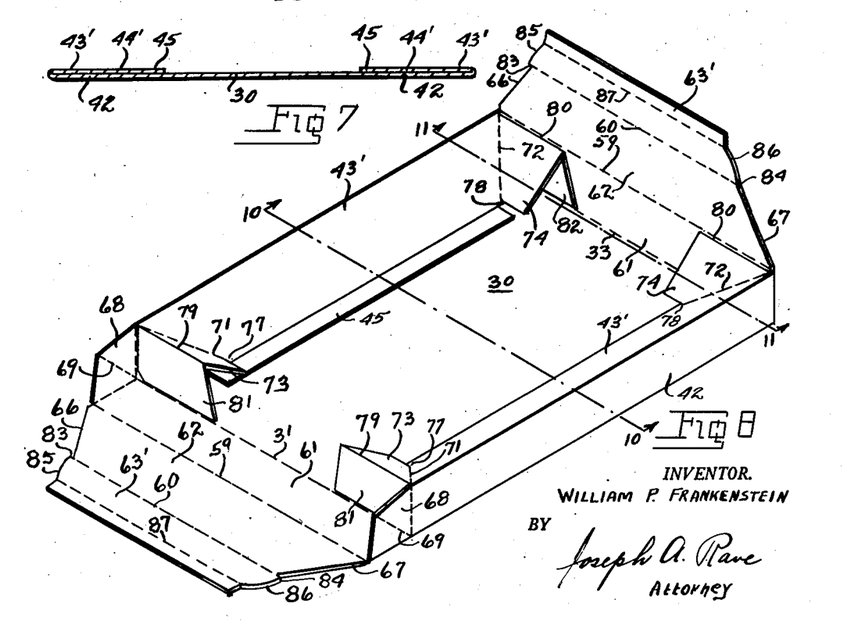
Fig. 7 is a sectional view through the folded blank of Fig. 6 showing same in the folded position as shipped to the user.
Fig. 8 is a view similar to Fig. 3 showing a partially erected carton from the blank of Fig. 6.
Figure 9:
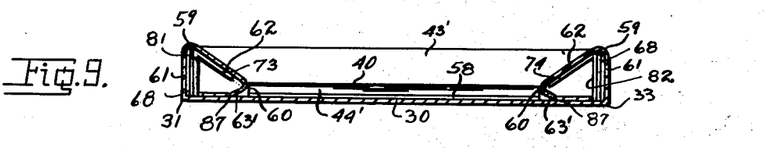
Fig. 9 is a longitudinal sectional view through a carton fully erected from the blank of Fig. 6 and taken at right angles to Fig. 10.
Figure 10:
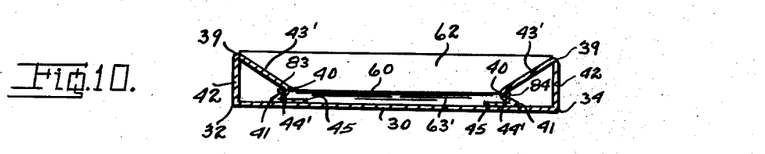
Fig. 10 is a transverse sectional view through an erected carton similar to Fig. 8 taken on line 10—10 on said Fig. 8.
Figure 11:
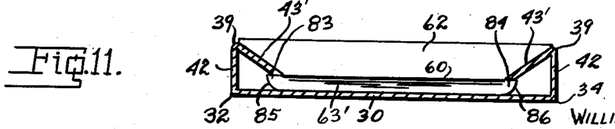
Fig. 11 is a transverse sectional view similar to Fig. 10 taken in a plane ahead of that of Fig. 10 illustrating the locking of the end walls as seen from line 11—11 on Fig. 8.

The carton of Figs. 8, 9, 10 and 11 is erected in the same manner as above described in connection with the carton of Figs. 3, 4 and 5 with, however, the lugs or tabs 73—74 and 81—82 forming a substantially triangular brace such as illustrated in Fig. 8 at each corner of the carton and wherein the tab 81 extends substantially vertically of the main or bottom panel of the carton while the tab 73 inclines inwardly and downwardly of the carton at the angle that the end wall top wall member is to take. In other words the end wall top wall member or panel 62 rides on the said lugs or tabs 73 and are vertically braced by the lugs or tabs 81 to add strength and rigidity to the carton. Due to the angular relationship of the parts the score or fold lines 79 and 80, between the bracing tabs or lugs, are angularly related to the transverse score or fold lines of the blank.

In the final assembly of the carton of Fig. 8 and particularly in assembling the end walls the arcuate formations 85 and 86 enter the cuts or resulting slits 77 and 78 at the opposite ends of the side walls top wall members. Due to the said arcuate or specific formations 85 and 86 the parts are slightly spread either by flexing the panel 63' or slightly outwardly urging the side wall top wall members 43' until the outermost corners of the locking lugs 83 and 84 are below the surface of the side walls top wall members whereupon the parts assume their normal positions with the side walls top wall members, at the base of the slits 77 and 78, in the corners provided by the end wall inclined edges 66 and 67 and the said locking lugs 83 and 84 as clearly illustrated in Fig. 11. At this time the carton is locked in its erected position, the lock being effective to the extent that the carton may be destroyed in attempting to unfold the same to its knocked-down position and which unfolding can be accomplished with the carton of Figs. 3, 4 and 5.

The modification of the blank illustrated in Figs. 12, 13, 14, 15 and 16 is substantially identical with the blank of Fig. 1 except that the wall members or panels are reversed with the inner wall members of the side and end walls adjacent the main or bottom panel instead of the outer wall members of these walls being adjacent thereto as illustrated in Figs. 1 and 6. In addition, the side wall members have their outer edge secured to the under surface of the main or bottom panel instead of to the upper surface as above described. With this construction the exposed surface of the carton bottom or main panel as well as the outer or exposed surface of the side and end walls are the same side of the blank instead of having these surfaces reversed as is the case with the blanks of Figs. 1 and 6.

Figure 12:
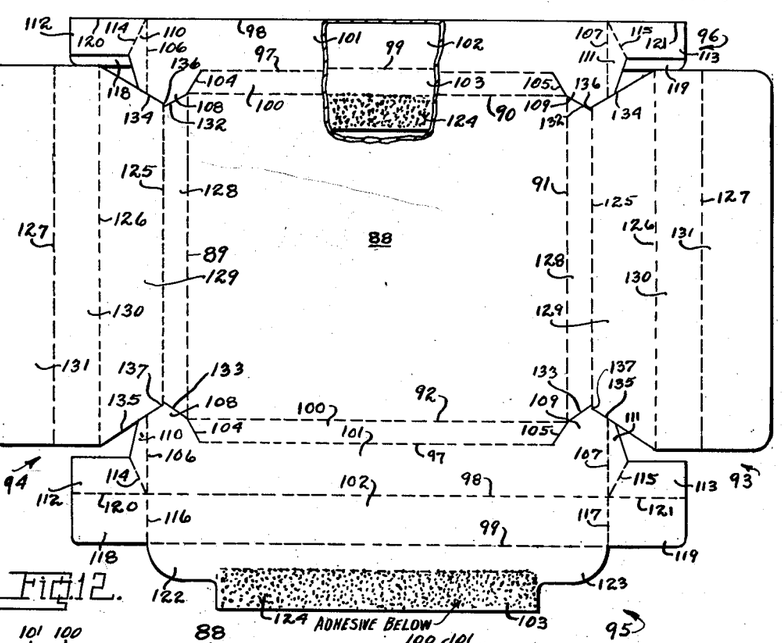
Fig. 12 is a view similar to Figs. 1 and 6 illustrating a further modified blank, partially folded, for producing a carton similar in appearance and utility with the cartons of said Figs. 1 and 6.

Specifically, the blank of Fig. 12 comprises a main or bottom panel 88 having its sides defined by score or fold lines 89, 90, 91 and 92 with said score or fold lines 89 and 91 integrally hingedly connecting with the bottom panel 88 substantially identical extensions 93 and 94 to form the end walls of the carton while the score or fold lines 90 and 92 respectively integrally hingedly connect with the bottom 88 substantially identical extensions 95 and 96 which in the erected carton form the side walls.

Since the side wall extensions 95 and 96 are substantially identical it is deemed sufficient if but one of them be described in detail. Accordingly, extension 95, between the score or fold line 92 and the outer edge thereof, is provided with a plurality of parallel score or fold lines 97, 98 and 99 thereby providing panels 100, 101, 102 and 103.

The panel 100 in the erected carton forms the side wall inner wall member which extends upwardly and inwardly of the carton in substantially the same manner as above described in connection with the blanks of Figs. 1 and 6 with said panel 100 having its ends defined by cut lines 104 and 105 which are angularly related to one another and to the panel so as to accommodate the end wall inner wall member as will be obvious. The panel 101 in the erected carton forms the top wall member and upwardly, outwardly inclines from the panel 100 and is of a length greater than that of the panel 100 having its ends defined by score or fold lines 106 and 107 which, however, are normal to the said panel and being spaced outwardly from the cut lines 104 and 105 provide lugs 108 and 109 on said panel 101 which corresponds with the lugs 56 and 57 of the blank of Fig. 1. The score or fold lines 106 and 107, respectively, hingedly connect with the ends of the panel 101 substantially triangular shaped lugs 110 and 111, which, in turn, have integrally, hingedly connected therewith flaps 112 and 113, respectively, through a fold or score line 114 and 115. The panel 102 in the erected carton forms the side wall outer wall member and has its ends defined by score or fold lines 116 and 117 which are in substantial alignment with the score or fold lines 106 and 107 thereby making the outer wall member of a length substantially equal to the top wall member. The score or fold lines 116 and 117, respectively, integrally, hingedly connect with the panel 102 a flap 118 and 119 which is in turn, respectively, integrally, hingedly connected with flaps 112 and 113, respectively, through score or fold lines 120 and 121 which are substantially continuations of the score or fold line 98 between the top wall member or panel 101 and the outer wall member or panel 102. The remaining panel 103 has its ends reduced as at 122 and 123 for a purpose which will presently be made clear to act as means for locking the end walls in erected positions. The panel 103 between its reduced end portions 122 and 123 is provided, for a distance inwardly of its free edge, with adhesive 124 in order to secure the side wall extensions in operative position.

The end wall extensions 93 and 94, again, being substantially identical it is deemed sufficient if but one of them be described in detail. Accordingly, the extension 93 is provided between the score or fold line 91 and the end of the extension with a plurality of score or fold lines 125, 126 and 127 thereby providing parallel panels 128, 129, 130 and 131 in the extension. In the erected carton the panel 128 forms the end wall inner wall member and has its ends defined by cut lines 132 and 133 which are angularly related to one another and to the panel for the reason that the said inner wall member inclines inwardly and upwardly in the same manner that the side walls inner wall members 100 correspondingly incline.

The panel 129 in the erected carton forms the top wall member which upwardly, outwardly inclines from the inner wall member and has its ends biased as illustrated at 134 and 135 so as to rest on the upwardly, outwardly inclining side walls top wall members. The remaining panels 130 and 131 constitute the end walls outer wall members and locking flap and are of a length substantially equal to the width of the erected carton and particularly the distance between the side wall outer wall members.

Figures 17, 18, 22, 23:
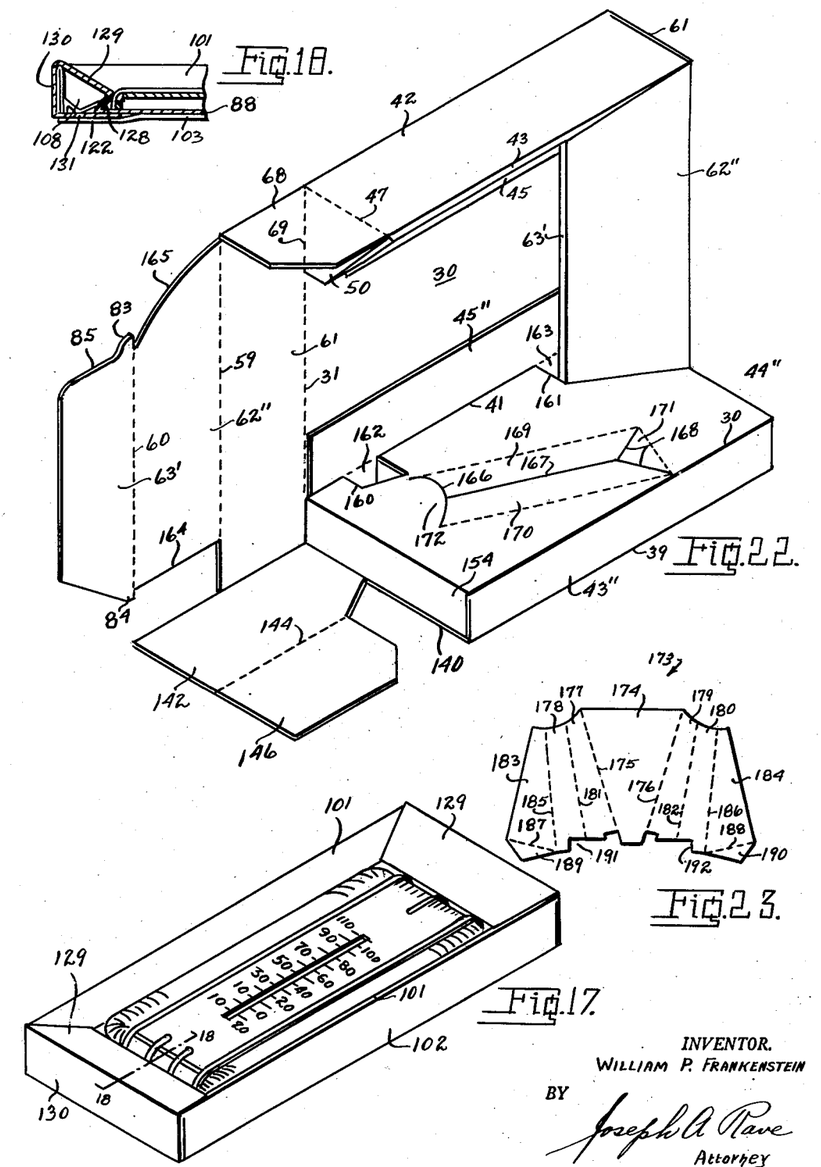
Fig. 17 is a perspective view of a completely erected carton, specifically that from the blank of Fig. 12, although a substantially identical appearance would be presented from the blanks of Figs. 1 and 6, with said Fig. 17 illustrating an article mounted or disposed within the carton.
Fig. 18 is a fragmentary sectional view through one end of the erected carton of Fig. 17 illustrating the cooperation of the carton walls in retaining an article within the carton.
Fig. 22 is a perspective view of a partially erected display and shipping carton from the blank illustrated in Figs. 19 and 20.
Fig. 23 is an extended plan view of a blank utilized in conjunction with the blank of Figs. 19 and 20 for shipping and displaying articles.

It should be noted that the longitudinal edge of the panel 129, where it joins with the panel 128, is slightly longer than the adjacent edge of the said panel 128 thereby providing shoulders 136 and 137 which cooperate with the side walls top wall members in producing a fit between the end walls top wall members and said side wall top wall members as is clearly illustrated in the erected carton of Fig. 17.

The blank of Fig. 12 after being scored and cut as there illustrated and above described has adhesive 124 applied to the undersurface of the panels or flaps 103 in the portion thereof as illustrated. The side wall extensions 95 and 96 are then folded downwardly, as seen in Fig. 12, on their respective score or fold line 98 thereby bringing the adhesive 124 into engagement with the undersurface of the main or bottom panel 88. The said extensions 95 and 96 are then in the position illustrated for extension 96 in Fig. 12 or as illustrated in Fig. 13 and it is in this condition that the knocked-down carton is shipped to the user.

Figures 13, 14:
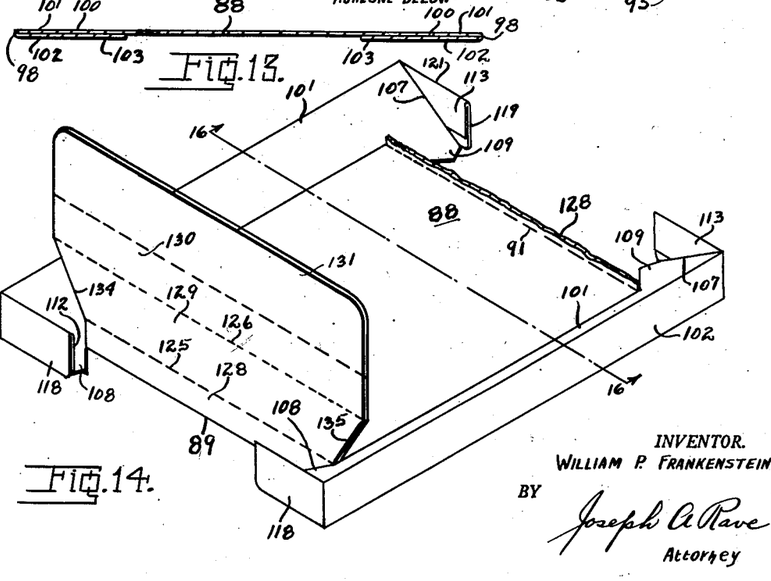
Fig. 13 is a transverse sectional view through the folded blank of Fig. 12 illustrating same in the condition in which it is shipped to the user.
Fig. 14 is a view similar to Figs. 3 and 8 showing a partially erected carton from the blank of Fig. 12 with a portion of said blank removed for more clearly illustrating the erection of the carton.
Figure 15:
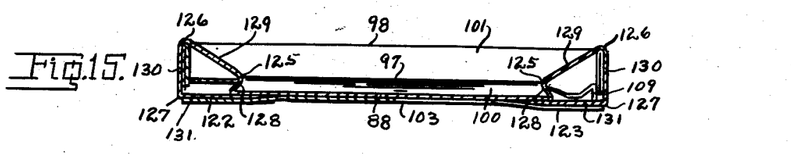
Fig. 15 is a longitudinal sectional view through a completely erected carton of Fig. 14, said view being taken partially adjacent one side wall and partially longitudinally centrally of the carton all at right-angles to Fig. 16.
Figure 16:
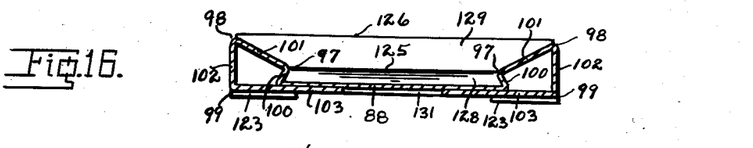
Fig. 16 is a transverse sectional view through the erected carton of Fig. 14 as seen from line 16—16 on said Fig. 14.

The user upon desiring to set up the carton follows substantially the same steps as above described, namely, first raising the collapsed side walls to their operative position whereupon the end wall extensions 93 and 94 are positioned as the extension 94 is illustrated in Fig. 14. The end walls are then in succession set up which consists of folding the tabs 112 and 118 to be across the carton and which automatically folds the tabs 110 and 112 into face contact in the nature of a bellows corner such as illustrated above and described in Fig. 1 and including the corner pieces 68.

The erection or folding of the carton end walls is substantially opposite to that of the blanks of Figs. 1 and 6 since the end wall inner wall member 128 is first positioned to upwardly and inwardly incline whereupon the end wall top wall member or panel 129 is arranged to upwardly and outwardly incline. The end wall outer wall member or panel 130 is then arranged to depend exteriorly of the carton to have the flaps 110—111, 112—113 and 118—119 arranged between the said end wall outer wall member or panel 130 and the adjacent ends of the side wall top wall members or panels 101. The flap or panel 131 is then disclosed beneath the carton main or bottom panel 88 and to underlie the adjacent lugs 122 and 123 of the side walls glue flaps or panels 124. The insertion of the said flap or panel 131 between the lugs 122 and 123 and the carton bottom panel 88 locks the walls in their erected and set-up positions.

After one of the said end walls has been set up the article to be shipped and displayed in the carton may then be placed therein, instead of waiting until both end walls have been erected, as is the convenient way of placing articles in the modifications of the invention disclosed in Figs. 1 and 6. After the article has been inserted in the carton the second or remaining end wall is then set up as just described.

As illustrated in Fig. 18, the carton inner wall members, due to the inclination thereof, overlap and rest on the adjacent edge of the article and actually secure the article between themselves against independent movement relative to the carton bottom, both longitudinally and laterally thereof, and at the same time act as a hold-down for the article, to hold it against the carton bottom. This securing of the article is only along the edge thereof so that the article itself is fully exposed and can be readily viewed through the open top of the carton. The inclining of the carton top walls adds a distinctive appearance to the device and enhances the appearance and display value of the carton as well as the article. The inward projections of the walls inner wall members give a shadowy depth around the article thereby again enhancing the displayed article and contributing to the salability of the article.

The modification of the invention illustrated in Figs. 19 to 26, inclusive, instead of having each of the walls of a similar cross-section, has one of the walls extended outwardly to form an article or goods supporting and display base while the portion of the article above the base is enhanced by the inclined top and inner wall members of the remaining carton walls, as above described. The blank is clearly illustrated in Fig. 19 and as there shown is substantially identical with the blank of Fig. 6 except that one of the, so called, side wall extensions is modified to form the goods or article display base while the end wall extensions are slightly modified to accommodate said base.

Figure 19:
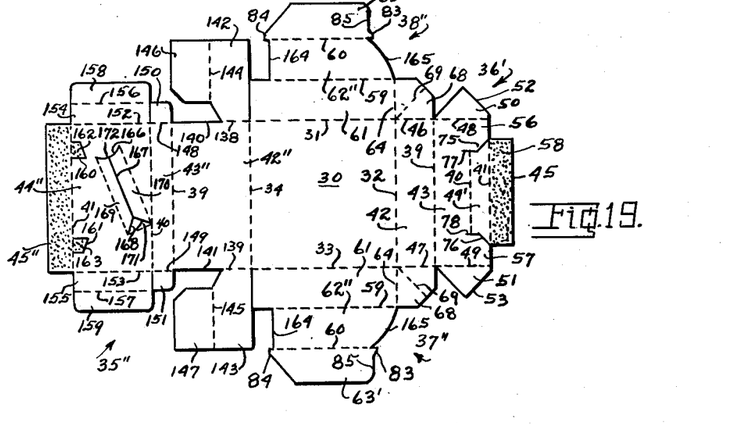
Fig. 19 is an extended plan view of a blank for forming a further modification of the basic carton of the present invention.
Figure 20:
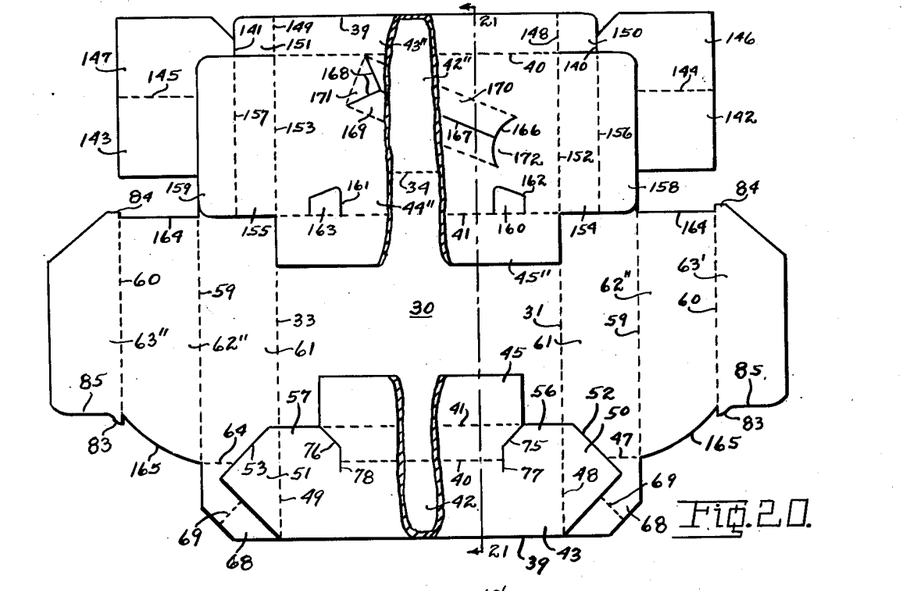
Fig. 20 is an enlarged view of the blank of Fig. 19 showing the same in the folded position as produced by the carton manufacturer.
Figure 21:
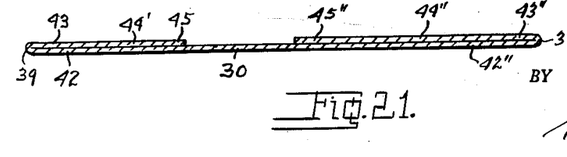
Fig. 21 is a transverse sectional view through the folded blank of Fig. 20 as seen from line 21—21 on said Fig. 20.
Figures 25, 26:
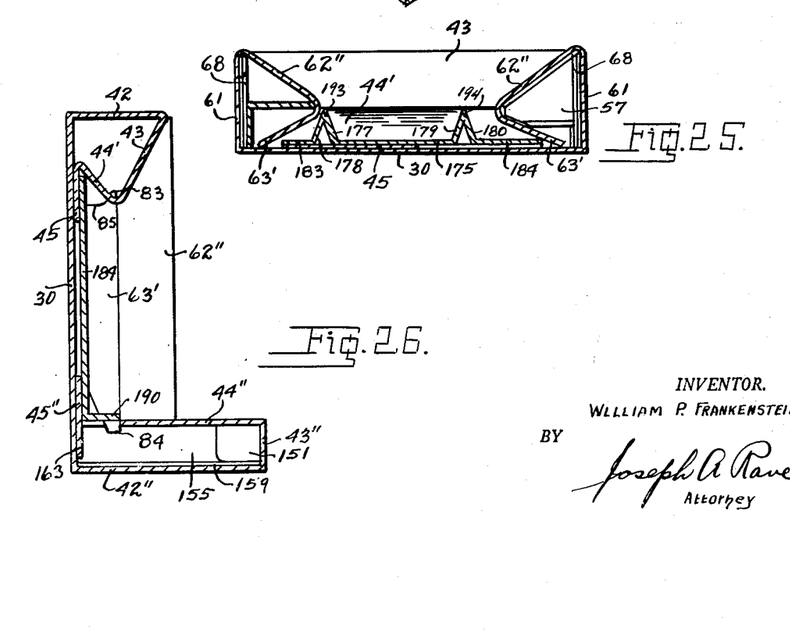
Fig. 25 is a sectional view through the erected carton of Fig. 24 as seen from line 25—25 on said Fig. 24.
Fig. 26 is a vertical sectional view of the erected carton taken adjacent one side wall of the erected carton and at right angles to Fig. 25.

Specifically, the blank in Fig. 19 has the side wall extension 35" provided with the score or fold lines 39, 40 and 41 between the main or back panel side defining score 34 and the end of the said extension thereby providing in the extension panels 42", 43", 44" and 45". These panels form in the erected carton, respectively, the base or bottom wall of the display base, the front of said display base, the top or article supporting panel of the display base and a glue flap. As illustrated in Fig. 26 the display base is substantially rectangular in cross-section and projects ahead of the carton walls wherefore the panels 42" and 44" are of substantially equal area and of greater height or width than the outer wall members or panels 61 of the end wall extensions 37" and 38". The panel 42" has its ends defined in part by score lines 138 and 139 and in part by cut lines 140 and 141 with said score and cut lines 138—140 and 139—141, respectively, in alignment with the carton back panel end defining score or fold lines 31 and 33. The score or fold lines 138 and 139 respectively, hingedly connect with the panel 42" tucking flaps 142 and 143 which in turn have integrally, hingedly connected therewith, respectively, through a score or fold line 144 and 145 a bracing flap 146 and 147. The display base front or panel 142 has its ends defined by score or fold lines 148 and 149 which respectively, hingedly connect to the ends of the panel 43" tucking flaps 150 and 151 utilized in closing the ends of the display base. The panel 44" has its ends defined by score or fold lines 152 and 153 which, respectively, hingedly connect to the ends thereof a closing flap 154 and 155 which are respectively subdivided by a score or fold line 156 and 157 to provide a tucking flap 158 and 159 for the display base closure panels 154 and 155. The display base panel 44" is further provided near the outer corners thereof with substantially U-shaped cuts 160 and 161 thereby providing lugs 162 and 163 integral with the panel or flap 45" which in the erected carton provide openings for locking the end walls in their erected positions.

The end wall extensions 37" and 38" are modified to the extent that their panels 62" are cut short at one end as at 164 so as to be behind their respective locking lug 84 of the panel or end wall inner wall member and tucking flap 63'. In addition, the said panels 62" or end wall top wall members each has its remaining edge arcuate shaped as at 165 instead of a plain bias or angle. It should be noted however that this formation whether arcuate shaped as at 165 or straight as at 66 is a matter of choice, the former adding a slight amount of grace to the display which in some instances is desirable over the straight edge of the latter construction.

In some instances it may be desirable to arrange the display base article supporting panel 44" with means for retaining the article therein. The specific article displayed in the drawings in this application is such an example, wherefore the said panel 44" is shown as having an arcuate cut line 166, a relatively long straight cut line 167 and two angular cut lines 168 with the ends of the angular lines 168 joined with one another by a score or fold line and with the ends of said angular cut lines 168 joined, respectively, with the ends of the arcuate cut line 166 by similar score or fold lines thereby providing flaps 169, 170 and 171 within said score lines and the arcuate cut lines which cooperate with a tongue 172 provided by the cut line 166 to support the article shown in Fig. 24, as a cylinder having one end thereof closed.

After the blank has been cut and scored as illustrated in Fig. 19, adhesive 58 is applied to the glue flap or panel 45 of side wall extension 36' while similar adhesive 58 is applied to the panel or glue flap 45" of the extension 35" and at the same time adhesive is applied to the lugs 162 and 163 of said extension 35" as illustrated in Fig. 19. The extensions 36' and 35" are then respectively folded on their score or fold line 39 to bring the adhesive into contact with the carton main panel 30. The blank is then in the folded position of Fig. 20 or in the position of Fig. 21 and it is in this condition that the blank is shipped to the user for erection.

The user in desiring to place merchandise within the carton first sets up the display base which consists in raising the extension 35" from its knock-down position to have the base panel 42" and goods supporting and display panel 44" parallel with one another and spaced apart by the display base front 43". It will be noted that the inner end of the display or goods supporting panel 44" is secured to the carton main panel or back 30 upwardly a distance equal to the height of the display base front 43". At this time the tucking flaps 150 and 151 are arranged to extend across the display base panel 42" whereupon the closure flaps 154 and 155 are arranged to depend from the display panel 44" to the base panel and have their tucking flaps 158 and 159 inserted within the display base for thereby locking the same in its erected position. It will be noted from Fig. 22 that the setting up of the display base opened into the panel 44" apertures corresponding to the outline of the lugs 162 and 163.

The extension 36' is then erected as above described.

At this time the tucking flaps 142 and 143 are positioned vertically of the display base and the reinforcing flaps 146 and 147 arranged to project inwardly and downwardly or rearwardly of the carton. The end wall extensions 37" and 38" are then folded as described above in connection with Figs. 1 and 6 to provide the end walls outer wall members normal to the carton panel 30, with the top wall members inclining inwardly and downwardly or rearwardly of the carton and the end walls inner wall members inclining downwardly and outwardly or rearwardly to the said carton main panel. The said end walls are locked in their erected positions by having the locking lugs 83 and 84 respectively received in the adjacent side wall locking slits 77 and 78 and in the display base goods supporting panel aperture provided by the adjacent lugs 162 and 163. The carton is now in a position to receive goods or an article for shipment and display purposes with said article either held in position by the article receiving opening in the panel 44' or being engaged by the inclined inner wall members of the carton walls as set forth above. In the specific example of the use of the carton of Figs. 19 and 26, use is made of an article attaching member which in addition adds to the attractiveness of the display and which member will now be described.

The article attaching panel indicated in its entirety by the reference character 173 in Fig. 23 is formed from a single piece of card or paper board material having a central or body portion 174 and embraced by the upper and lower edges of the blank and the lateral converging score or fold lines 175 and 176. Attached to the body portion 174 through the score or fold lines 175 and 176 are a pair of panels 177 and 178 and 179 and 180 with each pair having its individual panels separated, respectively, by a score or fold line 181 and 182. Outwardly of the panels 178 and 180, respectively, is an additional panel or wing 183 and 184 connected with its respective panel 178 and 180 through score or fold lines 185 and 186. The wings 183 and 184 have respectively connected with their lower ends through score or fold lines 187 and 188 a foot piece 189 and 190. The lower ends of the panels 177—180 are each cut back to form notches 191 and 192 which cooperate with the article in the carton in retaining it in position for shipment and display.

Figure 24:
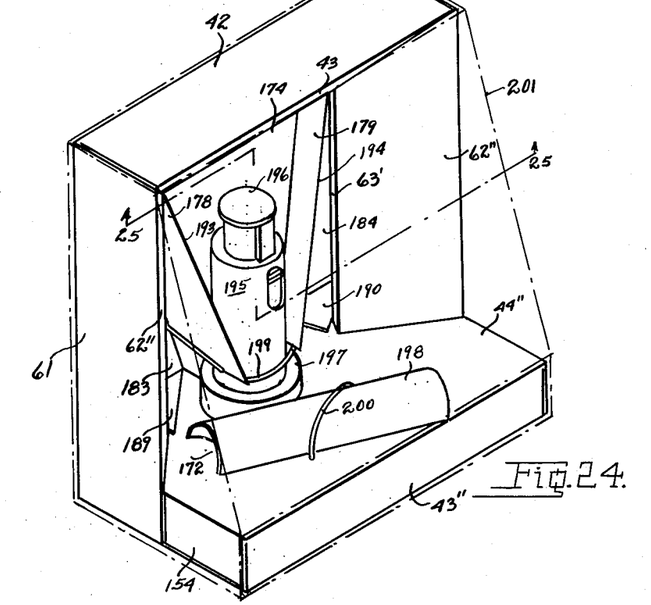
Fig. 24 is a perspective view of a completely erected shipping and display carton from the blanks of Figs. 19 and 22 showing a display of a specific item or article.

In practice, the blank 173 is folded on its score lines 175—176, 181—182 and 185—186 to thereby provide a pair of ribs 193 and 194, see Figs. 25, with said ribs diverging from the lower end of the blank to the upper end thereof as disclosed in Fig. 24. The ribs 193 and 194 have the body portion 174 of the blank and the wings 183 and 184 in the same plane and which when mounted in position in the carton is against the back of the carton as illustrated in Fig. 25. At this time also the tabs or foot pieces 189 and 190 are outwardly bent and rest on the goods supporting panel 44" of the display base as clearly illustrated in Fig. 24. The folding of the blank of Fig. 23 to the position just described and illustrated in Fig. 25 provides notches in the ribs 193 and 194 at the lower ends thereof which cooperate with the specific article illustrated in Fig. 24 and as there clearly disclosed.

As shown in Fig. 24 the specific article disclosed is a small atomizer which comprises a body portion 195 having reciprocally therethrough a plunger 196 with said atomizer body portion 195 having a radially projecting base 197. It is with this base that the goods carrying member ribs 193 and 194 cooperate through the shoulders formed in said ribs by the notches 191 and 192. The atomizer is adapted to be normally closed or covered by the above referred to cylinder illustrated in Fig. 24 at 198 which has one end open to be lowered over the body portion 195 of the atomizer. It is of course understood that the cover 198 could have been left on the atomizer in its normal position but for display purposes, it has been separated and placed on the display base of the shipping and display carton.

In order to more securely retain the atomizer in position, use is made of an elastic retaining member 199 which encircles the atomizer body 195, passes beneath the goods supporting member rib shoulders to the said goods supporting panel to which the ends of the elastic are attached in any suitable or desirable manner. Similarly, an elastic retaining member 200 is employed to encircle the atomizer cover 198 and have its ends secured in the goods supporting panel of the display base.

The specific example of the use of the shipping and display carton of Figs. 19 to 26, inclusive, lends itself to the use of a cover of clear or transparent material such as the cellulose or plastic covering materials at present being used for this purpose with said cover being illustrated in Fig. 24 in phantom lines and indicated by the reference character 201. It is to be understood of course that the cover 201 may be of opaque material or a simple enclosing carton may be provided for the shipping and display carton above described.

It should be further noted that the goods supporting member 173 is not absolutely essential to the use of the carton since articles of a different size or configuration may be packed for shipment and display purposes in said carton with said article cooperating with the inner wall members of the carton top and end walls in the same manner as above described in connection with the modification of the cartons in Figs. 1, 6 and 12, instead of having these wall members cooperate with the article supporting member.

In view of the foregoing, it is believed now evident that there has been provided a knocked-down carton which accomplishes the objects initially set forth.

What is claimed is:

1. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, each having the ends of its inner wall member inwardly of the corresponding ends of the top wall member and the top wall member having lugs flanking the ends of the inner wall member, a glue flap hingedly carried by the inner wall member for securing the lower ends of the inner wall members to the main panel inwardly of the connection of the outer wall member therewith a distance less than the width of the top wall member so that the inner wall members have their inner ends secured to the main panel, said inner and top wall members of each wall extending at angles of opposite inclination with respect to one another and to the main panel with the side wall top wall member lugs underlying the remaining opposed extensions top wall members for supporting same, and cooperating means on said extensions for locking the walls in their erected positions.

2. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, each having the ends of its inner wall member inwardly of the corresponding ends of the top wall member and the top wall member having lugs flanking the ends of the inner wall member, a glue flap hingedly carried by the inner wall member for securing the lower ends of the inner wall members to the main panel inwardly of the connection of the outer wall member therewith a distance less than the width of the top wall member so that the inner wall members have their inner ends secured to the main panel, said inner and top wall members of each wall extending at angles of opposite inclination with respect to one another and to the main panel with the side wall top wall member lugs underlying the remaining opposed extensions top wall members for supporting same, and cooperating means on said extensions for locking the walls in their erected positions, comprising flaps at the ends of the remaining opposed extensions, forming the end walls, beyond their inner wall members, and flaps on the side walls top wall members beyond the supporting lugs embraced by the end walls flaps.

3. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, each having the ends of its inner wall member inwardly of the corresponding ends of the top wall member and the top wall member having lugs flanking the ends of the inner wall member, a glue flap hingedly carried by the inner wall member for securing the lower ends of the inner wall members to the main panel inwardly of the connection of the outer wall member therewith a distance less than the width of the top wall member so that the inner wall members have their inner ends secured to the main panel, said inner and top wall members of each wall extending at angles of opposite inclination with respect to one another and to the main panel with the side wall top wall member lugs underlying the remaining opposed extensions top wall members for supporting same, cooperating means on said extensions for locking the walls in their erected positions, comprising flaps at the ends of the remaining opposed extensions, forming the end walls, beyond their inner wall members, and flaps on the side walls top wall members beyond the supporting lugs embraced by the end walls flaps, said supporting lugs inclining in the same plane as their respective top wall member, and said end walls top wall members having their ends biased for engagement with and support by the side walls top wall members and their supporting lugs.

4. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, each having the ends of its inner wall member inwardly of the corresponding ends of the top wall member and the top wall member having lugs flanking the ends of the inner wall member, a glue flap hingedly carried by the inner wall member for securing the lower ends of the inner wall members to the main panel inwardly of the connection of the outer wall member therewith a distance less than the width of the top wall member so that the inner wall members have their inner ends secured to the main panel, said inner and top wall members of each wall extending at angles of opposite inclination with respect to one another and to the main panel with the side wall top wall member lugs underlying the remaining opposed extensions top wall members for supporting same, cooperating means on said extensions for locking the walls in their erected positions, the side walls top wall members having the supporting lugs inclining in the same plane as their respective top wall member, and said end walls top wall members having their ends biased for engagement with and support by the side walls top wall members and their supporting lugs, said wall locking means comprising slits in the side walls top wall members at the ends of the side walls inner wall members, and locking lugs at the ends of the end walls inner wall members received in said slits to underlie said top wall members at the ends of said slits.

5. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, each having the ends of its inner wall member inwardly of the corresponding ends of the top wall member and the top wall member having lugs flanking the ends of the inner wall member, a glue flap hingedly carried by the inner wall member for securing the lower ends of the inner wall members to the main panel inwardly of the connection of the outer wall member therewith a distance less than the width of the top wall member so that the inner wall members have their inner ends secured to the main panel, said inner and top wall members of each wall extending at angles of opposite inclination with respect to one another and to the main panel with the side wall top wall member lugs underlying the remaining opposed extensions top wall members for supporting same, cooperating means on said extensions for locking the walls in their erected positions, comprising flaps at the ends of the remaining opposed extensions, forming the end walls, beyond their inner wall members, and flaps on the side walls top wall members beyond the supporting lugs embraced by the end walls flaps, said supporting lugs inclining in the same plane as their respective top wall member, said end walls top wall members having their ends biased for engagement with and support by the side walls top wall members and their supporting lugs, and tucking flaps at the ends of the side walls top wall members substantially triangular shaped in plan and upstanding from the side walls to underlie the end wall top wall member and support the same.

6. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, each having the ends of its inner wall member inwardly of the corresponding ends of the top wall member and the top wall member having lugs flanking the ends of the inner wall member, a glue flap hingedly carried by the inner wall member for securing the lower ends of the inner wall members to the main panel inwardly of the connection of the outer wall member therewith a distance less than the width of the top wall member so that the inner wall members have their inner ends secured to the main panel, said inner and top wall members of each wall extending at angles of opposite inclination with respect to one another and to the main panel with the side wall top wall member lugs underlying the remaining opposed extensions top wall members for supporting same, flaps at the ends of the remaining opposed extensions, forming the end walls, beyond their inner wall members, said end wall top wall members having their ends biased for engagement with and support by the side walls top wall members, and tucking flaps at the ends of the side walls top wall members each comprising a substantially triangular portion and a substantially rectangular portion, said triangular portion of each tucking flap being connected with its top wall member through a hinge or fold line angularly related to the axis of its top wall member and forming the hypotenuse of the substantially triangular portion of the tucking flap, said tucking flap in the erected carton having the triangular portion extending at the angle of the end wall top wall member and having the rectangular portion substantially normal to the main panel whereby said tucking flaps reinforce the corners of the erected carton.

7. In a carton of the class described formed from a single blank comprising a main panel, extensions from each side of the main panel, forming the walls of the carton, with each extension subdivided into panels constituting an outer wall member, a top wall member and an inner wall member, each top wall member of each extension having an effective length greater than the inner wall member of its extension and each top wall member having a width greater than the width of the inner wall member, two opposed extensions, forming the side walls, beyond the inner wall members thereof, each having a glue flap whereby the inner wall members have their inner ends secured to the main panel, said inner and top wall members of each wall extending at angles of opposite inclination with respect to one another and to the main panel, flaps at the ends of the remaining opposed extensions, forming the end walls, beyond their inner wall members, said end walls top wall members having their ends biased for engagement with and support by the side walls top wall members, tucking flaps at the ends of the side walls top wall members each comprising a substantially triangular portion and a substantially rectangular portion, said triangular portion of each tucking flap being connected with its top wall member through a hinge or fold line angularly related to the axis of its top wall member and forming the hypotenuse of the substantially triangular portion of the tucking flap, said tucking flap in the erected carton having the triangular portion inclining at the angle of the end wall top wall member and having the rectangular portion substantially normal to the main panel with said tucking flaps embraced by the end walls flap for thereby reinforcing the corners of the erected carton, slits into the side wall top wall members at the ends of the side walls inner wall members, and locking lugs at the ends of the end walls inner wall members adapted to penetrate the side wall top wall members slits to underlie said top wall members and thereby lock the carton walls in erected positions.

8. In a carton of the class described formed from a single blank comprising a main panel, extensions from each side of the main panel for forming the walls of the carton with each extension subdivided into panels constituting an inner wall member, a top wall member and an outer wall member for each wall, two opposed extensions, forming the carton side walls, having at the ends thereof glue flaps for attaching the extensions to the main panel, the inner and top wall members of said side wall extensions being of dissimilar length and width with the top wall members having their greater length attained by having the ends thereof beyond the ends of the inner wall members so as to provide lugs at and flanking the ends of the top wall member, said side walls having their inner and top wall members extending at opposite angles of inclination with said side walls top wall members lugs extending toward the center of the main panel, said remaining wall extensions forming the end walls and each having their inner and top wall members of dissimilar width and length whereby the end walls inner and top wall members incline in opposite directions in accordance with the angle of inclination of the side walls inner and top wall members, and means associated with the carton walls extensions for locking the walls in their erected positions.

9. In a carton of the class described formed from a single blank comprising a main panel, extensions from each side of the main panel for forming the walls of the carton with each extension subdivided into panels constituting an inner wall member, a top wall member and an outer wall member for each wall, two opposed extensions forming the carton side walls having at the ends thereof glue flaps for attaching the extension to the main panel, the inner and top wall members of said side wall extensions being of dissimilar length and width with the top wall members having their greater length attained by having the ends thereof beyond the ends of the inner wall members so as to provide lugs at and flanking the ends of the top wall member, said side walls having their inner and top wall members extending at opposite angles of inclination with said side walls top wall members lugs extending toward the center of the main panel, said remaining wall extensions forming the end walls and each having their inner and top wall members of dissimilar width and length whereby the end walls inner and top wall members incline in opposite directions in accordance with the angle of inclination of the side walls inner and top wall members, and means associated with the carton walls extensions for locking the walls in their erected positions, comprising a locking flap at the outer ends of the end walls extensions, and locking lugs at the ends of the side walls glue flaps which are free of the main panel to receive between themselves and said main panel the locking flaps of the end walls extensions.

10. In a carton of the class described formed from a single blank comprising a main panel, extensions from each side of the main panel for forming the walls of the carton with each extension subdivided into panels constituting an inner wall member, a top wall member and an outer wall member for each wall, two opposed extensions forming the carton side walls having at the ends thereof glue flaps for attaching the extension to the main panel, the inner and top wall members of said side wall extensions being of dissimilar length and width with the top wall members having their greater length attained by having the ends thereof beyond the ends of the inner wall members so as to provide lugs at and flanking the ends of the top wall member, said side walls having their inner and top wall members extending at opposite angles of inclination with said side walls top wall members lugs extending toward the center of the main panel, said remaining wall extensions forming the end walls and each having their inner and top wall members of dissimilar width and length whereby the end walls inner and top wall members incline in opposite directions in accordance with the angle of inclination of the side walls inner and top wall members, means associated with the carton walls extensions for locking the walls in their erected positions, comprising a locking flap at the outer ends of the end walls extensions, and locking lugs at the ends of the side walls glue flaps which are free of the main panel to receive between themselves and said main panel the locking flaps of the end walls extensions, and a tucking and reinforcing corner flap including a triangular portion and a rectangular portion carried by the side walls top wall members to be disposed transversely of the carton and enclosed by the end walls top and outer wall members.

11. In a carton of the class described formed from a single blank comprising a main panel, extensions from each side of the main panel forming the walls of the carton, a pair of opposed extensions each divided into a plurality of panels forming side walls having outer wall members, top wall members and inner wall members, the inner and top wall members in, at least, one side wall being of dissimilar length and width with said top wall member being of greater width than the inner wall member and with said inner wall member having its ends inwardly of the corresponding ends of the top wall member and the top wall member having lugs projecting therefrom beyond the ends of the inner wall member with said lugs projecting, at least, to the outer edge of the inner wall member in the direction of the inner wall member width, a glue flap at the ends of each side wall extension whereby the inner wall members of each side wall has its free end secured to the main panel, the remaining opposed extensions each subdivided into panels to form end walls each having an outer wall member, a top wall member and an inner wall member, said inner and top wall members of the end walls and the inner and top wall member of the said one side wall respectively inclining in opposite directions with respect to one another and to the main panel and the said one side top wall member projecting lugs extending downwardly toward and transversely of the bottom panel beneath the end walls top wall members, and cooperating means on said walls for locking same in erected positions.

12. In a carton of the class described formed from a single blank comprising a main panel, extensions from each side of the main panel forming the walls of the carton, a pair of opposed extensions each divided into a plurality of panels forming side walls having outer wall members, top wall members and inner wall members, the inner and top wall members in, at least, one side wall being of dissimilar length and width with said top wall member being of greater width than the inner wall member and with said inner wall member having its ends inwardly of the corresponding ends of the top wall member and the top wall member having lugs projecting therefrom beyond the ends of the inner wall member with said lugs projecting, at least, to the outer edge of the inner wall member in the direction of the inner wall member width, a glue flap at the ends of each side wall extension whereby the inner wall members of each side wall has its free end secured to the main panel, the remaining opposed extensions each subdivided into panels to form end walls each having an outer wall member, a top wall member and an inner wall member, said inner and top wall members of the end walls and the inner and top wall member of the said one side wall respectively inclining in opposite directions with respect to one another and to the main panel and the said one side top wall member projecting lugs extending downwardly toward and transversely of the bottom panel beneath the end walls top wall members, cooperating means on said walls for locking same in erected positions, said remaining side wall having its inner and outer wall members of substantially equal length and breadth and parallel with one another in spaced apart relation with a top wall member therebetween, end closure flaps carried by the said remaining side wall inner wall member, and said locking means including a locking lug at one end of each end wall inner wall member received in an aperture in said remaining side wall inner wall member.

13. In a carton of the class described formed from a single blank comprising a main panel, extensions from each side of the main panel forming the walls of the carton, a pair of opposed extensions each divided into a plurality of panels forming side walls having outer wall members, top wall members and inner wall members, the inner and top wall members in, at least, one side wall being of dissimilar length and width with said top wall member being of greater width than the inner wall member and with said inner wall member having its ends inwardly of the corresponding ends of the top wall member and the top wall member having lugs projecting therefrom beyond the ends of the inner wall member with said lugs projecting, at least, to the outer edge of the inner wall member in the direction of the inner wall member width, a glue flap at the ends of each side wall extension whereby the inner wall members of each side wall has its free end secured to the main panel, the remaining opposed extensions each subdivided into panels to form end walls each having an outer wall member, a top wall member and an inner wall member, said inner and top wall members of the end walls and the inner and top wall member of the said one side wall respectively inclining in opposite directions with respect to one another and to the main panel and the said one side top wall member projecting lugs extending downwardly toward and transversely of the bottom panel beneath the end walls top wall members, cooperating means on said walls for locking same in erected positions, said remaining side wall having its inner and outer wall members of substantially equal length and breadth and parallel with one another in spaced apart relation with a top wall member therebetween, end closure flaps carried by the said remaining side wall inner wall member, and said locking means including a locking lug at one end of each end wall inner wall member received in an aperture in said remaining side wall inner wall member, and a locking lug at each opposite end of each end wall inner wall member received in a split in the said one side wall top wall member.

14. In a carton of the class described formed from a single blank comprising a main panel, extensions from each side of the main panel forming the walls of the carton, a pair of opposed extensions each divided into a plurality of panels forming side walls having outer wall members, top wall members and inner wall members, the inner and top wall members in, at least, one side wall being of dissimilar length and width with said top wall member being of greater width than the inner wall member and with said inner wall member having its ends inwardly of the corresponding ends of the top wall member and the top wall member having lugs projecting therefrom beyond the ends of the inner wall member with said lugs projecting, at least, to the outer edge of the inner wall member in the direction of the inner wall member width, a glue flap at the ends of each side wall extension whereby the inner wall members of each side wall has its free end secured to the main panel, the remaining opposed extensions each subdivided into panels to form end walls each having an outer wall member, a top wall member and an inner wall member, said inner and top wall members of the end walls and the inner and top wall member of the said one side wall respectively inclining in opposite directions with respect to one another and to the main panel and the said one side top wall member projecting lugs extending downwardly toward and transversely of the bottom panel beneath the end walls top wall members, cooperating means on said walls for locking same in erected positions, said remaining side wall having its inner and outer wall members of substantially equal length and breadth and parallel with one another in spaced apart relation with a top wall member therebetween, end closure flaps carried by the said remaining side wall inner wall member, said locking means including a locking lug at one end of each end wall inner wall member received in an aperture in said remaining side wall inner wall member, a locking lug at each opposite end of each end wall inner wall member received in a slit in the said one side wall top wall member, and tucking flaps at the ends of the side walls outer wall members enclosed by the end walls inner and outer wall members.

WILLIAM P. FRANKENSTEIN.

References Cited in the file of this patent

UNITED STATES PATENTS

| Number | Name | Date |
|---|---|---|
| 1,331,009 | Ford | Feb. 17, 1920 |
| 2,130,602 | Smith | Sept. 20, 1938 |
| 2,144,646 | Zalkind | Jan. 24, 1939 |
| 2,397,135 | Frankenstein | Mar. 26, 1946 |
| 2,451,209 | Frankenstein | Oct. 12, 1948 |
| 2,512,023 | Johnson | June 20, 1950 |
| 2,522,325 | Williamson | Sept. 12, 1950 |
| 2,531,255 | Clarke | Nov. 21, 1950 |